United States Patent [19]

Kindscher et al.

[11] 3,920,706

[45] Nov. 18, 1975

[54] LOW-FOAM SURFACTANTS RESISTANT TO ALKALIS

[75] Inventors: Wolfgang Kindscher, Fussgoenheim; Karl-Heinz Beyer, Frankenthal; Klaus Wulz, Ludwigshafen, all of Germany

[73] Assignee: BASF Aktiengesellschaft, Ludwigshafen (Rhine), Germany

[22] Filed: Jan. 17, 1974

[21] Appl. No.: 434,247

[30] Foreign Application Priority Data
Jan. 20, 1973 Germany..........................2302876

[52] U.S. Cl. ...... 260/345.9; 260/611 B; 260/613 B; 260/615 B
[51] Int. Cl.² ......................................... C07C 41/00
[58] Field of Search ........ 260/615 A, 611 B, 613 B, 260/615 B, 345.9

[56] References Cited
UNITED STATES PATENTS

| | | | |
|---|---|---|---|
| 2,566,415 | 9/1951 | Hoaglin et al.................... | 260/614 R |
| 2,883,429 | 4/1959 | Haszeldine...................... | 260/615 A |
| 2,905,721 | 9/1959 | de Benneville et al...... | 260/615 B X |
| 3,244,753 | 4/1966 | Leary.......................... | 260/615 A X |

*Primary Examiner*—Bernard Helfin
*Attorney, Agent, or Firm*—Johnston, Keil, Thompson & Shurtleff

[57] ABSTRACT

Process for the manufacture of surfactants from alkoxylated alcohols and vinyl ethers, the alkoxylated alcohols used being those containing oxyethyl and oxypropyl groups, the ratio of oxypropyl to oxyethyl being at least 1:1.

3 Claims, No Drawings

LOW-FOAM SURFACTANTS RESISTANT TO ALKALIS

This invention relates to a process for the manufacture of surfactants in which an alkoxylated alcohol is reacted with a vinyl ether. The invention also relates to the use of said agents in industrial cleaner formulations.

Although polyalkoxylated phenols and polyalkoxylated aliphatic alcohols are suitable non-ionic surfactants for use in detergents, they are less suitable as components of industrial cleaner formulations, since these require the presence of alkaline substances. Polyalkoxylated aliphatic alcohols or alkyl phenols are readily oxidized and thus degraded in the presence of strongly alkaline compounds such as soda or caustic potash, and this leads to discloration.

It is known that the free terminal hydroxyl groups of polyalkoxylated alcohols or phenols may be reacted with reactive groups to produce stable polyethers. This teaching forms the subject matter of German Published Application No. 1,520,647 for example, according to which polyethoxylated alcohols or alkyl phenols are reacted with olefins so as to close the terminal groups, i.e. the free hydroxyl groups.

U.S. Pat. No. 2,905,721 describes symmetrical polyglycol ethers having closed end groups and obtained by reaction of vinyl ethers with polyglycol ethers based on ethylene oxide. Said patent describes these compounds as low-foaming cleaning agents.

According to said U.S. patent, the reaction takes place in an acid medium.

It is an object of the invention to provide means of further improving the good properties, as described in said reference, of the reaction products of vinyl ethers and polyglycol ethers.

The invention relates to a process for the manufacture of surfactants involving the reaction of polyalkoxylated alcohols with vinyl ethers and characterized in that a polyalkoxylated alcohol of formula I $$R^1-(OC_2H_4)_n-(OC_3H_6)_m-O-H \qquad I$$

is reacted, in the presence of alkaline substances, with a vinyl ether of formula II or III:

$$CH_2 = CH - O - R^2 \qquad II$$

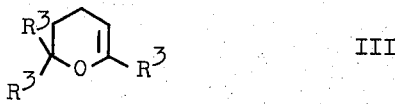

where $R^1$ denotes a straight-chain or branched-chain saturated or unsaturated alkyl radical of from 7 to 22 carbons or a mononuclear or dinuclear alkylaryl radical having from 8 to 12 carbons in the alkyl chain, $R^2$ denotes a straight-chain or branched-chain alkyl radical of from 1 to 10 carbons or an optionally $C_{1-4}$ alkyl-substituted cyclohexyl radical, $R^3$ denotes hydrogen or a $C_{1-4}$ alkyl radical, $n$ is an integer of from 1 to 30 and $m$ is an integer of from 5 to 50, provided that the ratio of $m:n$ is at least 1:1.

The reaction products produced by the process of the invention have been found, surprisingly, to form excellent alkali-stable surfactants having much better antifoaming properties than prior art surfactants whilst retaining high detergency and good biological degradability.

One of the main factors in achieving the excellent antifoaming activity of the compounds of the invention is the ratio of propylene oxide to ethylene oxide of at least 1:1, in contrast to prior patents relating to such alkoxylated compounds, where higher propertions of ethylene oxide over propylene oxide (this ratio being at least 3:2) are always regarded as desirable in order to leave a sufficiently large number of hydrophilic groups in the molecule.

Suitable starting materials are long-chain alcohols of from 7 to 22 carbons and preferably of from 9 to 16 carbons. These may be saturated or unsaturated, branched or unbranched, and include all alcohols having said number of carbons or mixtures thereof. We prefer to use alcohol mixtures such as are obtained by oxo-synthesis from olefins obtained with Ziegler catalysts or by cracking. Particularly preferred alcohol mixtures are for example the $C_{12-15}$ and $C_{14-16}$ cuts.

Other suitable starting materials are the well-known isomeric alkyl phenols or alkyl naphthols, the alkyl radicals having from 8 to 12 carbon atoms. The alkyl phenol or alkyl naphthol may bear more than one alkyl radical on the nucleus, particularly suitable compounds being dialkyl phenols and dialkyl naphthols. Particularly suitable starting materials for the purposes of the invention are mono-nuclear phenols such as octyl phenol, nonyl phenol and dinonyl phenol.

The said materials are first reacted with from 1 to 30 moles and preferably with from 5 to 20 moles of ethylene oxide and are then propoxylated, during which process propylene oxide is used in an amount such that the molar ratio of propylene oxide to ethylene oxide is at least 1:1 and preferably from 1.1:1 to 5:1. Advantageously, from 5 to 50 moles and preferably from 10 to 25 moles of propylene oxide are used.

Ethoxylation and subsequent propoxylation are carried out by known methods in the presence of alkaline catalysts such as are suitable for the subsequent reaction with the vinyl ethers, preferably KOH or NaOH. Ethoxylation may be carried out at temperatures of, say, from 130° to 160°C and pressures of from 1 to 6 atmospheres, whilst propoxylation may be carried out at temperatures of, say, from 110° to 130°C and pressures of from 1 to 11 atmospheres.

The polyalkoxylated alcohols or phenols as defined above are then reacted with a vinyl ether of formula II or III using small amounts of alkaline-reacting agents as catalysts. To achieve as near 100% conversion as possible, it is advantageous to use from 2 to 3 moles of the vinyl ether of formula II or the cyclic unsaturated ether of formula III per free hydroxyl group. In these formulae, $R^2$ preferably denotes an alkyl radical of from 1 to 10 carbon atoms or an optionally alkyl-substituted cyclohexyl radical, suitable alkyl substituents being 2-methyl and 2-ethyl groups. Preferred vinyl ethers of formula II to be used in the process of the invention are for example methyl vinyl ether, ethyl vinyl ether, isopropyl vinyl ether, n-butyl vinyl ether, isobutyl vinyl ether and 2-methyl-cyclohexyl vinyl ether. $R^3$ in formula III denotes hydrogen or $C_{1-4}$ alkyl. Preferred compounds of formula III are dihydropyran and 2,2,6-trimethyldihydropyran.

The alkaline-reacting compounds necessary in the production of surfactants are conventional inorganic bases such as alkali metal hydroxides, preferably sodium hydroxide and potassium hydroxide, alkaline earth metal hydroxides such as calcium hydroxide and magnesium hydroxide, alkali metal and alkaline earth metal carbonates such as sodium carbonate and potassium carbonate, alkali metal alcoholates such as sodium methoxide, sodium ethoxide and potassium t- butoxide, and organic bases such as primary, secondary and, preferably, tertiary amines, e.g. trimethylamine, triethylamine, tri-n-butylamine, tri-isopropylamine, and alkanol-amines such as tri-ethanolamine and tri-isobutanolamine.

The reaction may be conveniently carried out at temperatures of from 0° to 100°C. We prefer to use a temperature between 40° and 70°C.

The surfactants produced in the present invention may be characterized by their cloud points, as determined by means of thinlayer chromatography, and by their molecular weights. They are highly suitable, for example, for formulation with solid sodium hydroxide or sodium metasilicate and tripolyphosphate to give lowfoaming industrial cleaning agents which are resistant to alkalis and are suitable for cleaning all types of solid surface, for example for cleaning metals prior to plating, shaping and working or for cleaning dishes and bottles in automatic machines adapted for this purpose. Detergent formulations of said kinds contain, for example, from 2 to 5 parts of the said novel surfactants and 75 parts of solid sodium hydroxide and 25 parts of sodium metasilicate or from 2 to 5 parts of said novel surfactants and 50 parts of sodium hydroxide, 25 parts of sodium tripolyphosphate or 25 parts of sodium metasilicate as detergent fillers.

When these formulations are allowed to stand for relatively long periods, there is no discoloration or degradation of the surfactants, the latter being indirectly observable from the constant foaming properties.

Mixed with other substances, the surfactants of the invention are also suitable as wetting agents or cleaning agents in the treatment of textiles and for scouring nonporous surfaces of all kinds.

The resulting products have been found to be excellent cleaning surfactants showing good surface and interfacial activities in conjunction with low foaming properties. Their very good resistance to alkalis is shown by their color stability when in contact with strong alkalis at normal and elevated temperatures over relatively long periods. However, the surface-active functions, as measured in terms of surface tension, wetting action and low foaming properties, remain virtually unchanged under such chemical and thermal conditions.

The following Examples illustrate the invention with respect to the manufacture of the agents and their use as cleaning agents for solid surfaces. In the Examples the parts and percentages are by weight.

EXAMPLE 1

To a mixture of 533 parts of a reaction product of a $C_{12-15}$ oxo-alcohol mixture with 5 moles of ethylene oxide and 14 moles of propylene oxide and 0.2 part of potassium hydroxide there are added 67 parts of vinyl isobutyl ether at from 40° to 60°C, the rate of addition being controlled so as to maintain the mixture at the simmer. When the addition is complete, the reaction is allowed to continue for from about 3 to 4 hours at from 40° to 60°C.

Following neutralization of the reaction mixture with acetic acid, the volatile portions are distilled off under reduced pressure. There is obtained a clear, colorless thin oil in a yield of from 96 to 99%.

The resulting product is a low-foaming surfactant which is resistant to alkalis and has a good wetting action.

The following Table lists further products manufactured in a similar manner.

TABLE

| Ex. | Starting compound | Moles of $C_2H_4O$ | Moles of $C_3H_6O$ | $R^2$ | Cloud point+ | Surface tension dyness/cm | Foaming behavior (IG beating method) | | |
|---|---|---|---|---|---|---|---|---|---|
| | | | | | | | 1 min | 5 min | 10 min |
| 2 | $C_9$—$C_{11}$ oxoalcohol | 5 | 6 | $C_2H_5$ | 46.5 | 29.5 | 100 | 70 | 30 |
| 3 | $C_9$—$C_{11}$ oxoalcohol | 5 | 13 | i—$C_4H_9$ | 44.5 | 29.8 | 100 | 50 | 20 |
| 4 | $C_{12}$—$C_{15}$ oxoalcohol | 5 | 0 | i—$C_4H_9$ | 59.6 (in $H_2O$) | 24.9 | 480 | 100 | 70 |
| 5 | $C_{12}$—$C_{15}$ oxoalcohol | 5 | 6 | $CH_3$ | 45.9 | 30.1 | 50 | 20 | 5 |
| 6 | $C_{12}$—$C_{15}$ oxoalcohol | 5 | 6 | $C_2H_5$ | 46.3 | 30.9 | 9 | 5 | 0 |
| 7 | $C_{12}$—$C_{15}$ oxoalcohol | 5 | 6 | i—$C_4H_9$ | 43.7 | 30.4 | 10 | 5 | 0 |
| 8 | $C_{12}$—$C_{15}$ oxoalcohol | 5 | 13 | $CH_3$ | 46.4 | 30.5 | 0 | 0 | 0 |
| 9 | $C_{12}$—$C_{15}$ oxoalcohol | 5 | 13 | $C_2H_5$ | 49.9 | 31.4 | 10 | 8 | 0 |
| 10 | $C_{12}$—$C_{15}$ oxoalcohol | 5 | 13 | $C_3H_7$ | 45.8 | 31.0 | 15 | 10 | 5 |
| 11 | $C_{12}$—$C_{15}$ oxoalcohol | 5 | 13 | i—$C_4H_9$ | 43.7 | 30.5 | 5 | 0 | 0 |
| 12 | $C_{20-22}$ alcohol mixture | 6 | 14 | $C_2H_5$ | 49.8 | 31.1 | 10 | 0 | 0 |
| 13 | $C_{20-22}$ alcohol mixture | 6 | 14 | i—$C_4H_9$ | 46.5 | 30.8 | 5 | 0 | 0 |
| 14 | octylphenol | 10 | 0 | $C_2H_5$ | 50.2 | 30.5 | 600 | 300 | 200 |
| 15 | octylphenol | 5 | 10 | i—$C_4H_9$ | 49.1 | 30.0 | 20 | 10 | 5 |
| 16 | nonylphenol | 10 | 0 | i—$C_4H_9$ | 43.9 | 29.7 | 500 | 400 | 200 |
| 17 | nonylphenol | 10 | 10 | $C_2H_5$ | 40.5 | 29.9 | 170 | 100 | 50 |
| 18 | nonylphenol | 5 | 10 | $C_2H_5$ | 40.8 | 30.5 | 100 | 50 | 10 |

+1% in 40% butyl glycol

TEST RESULTS

The resistance of the products to alkalis was tested in three different ways to allow for observation of the behavior under different conditions.

EXPERIMENT 1

45.00 g of sodium metasilicate pentahydrate are spread out to a thin, uniform layer over the surface of a flat porcelain dish having a diameter of about 15 cm. The dish is placed on laboratory scales capable of weighing to an accuracy of 0.01 g. 5.00 g of the surfactant to be tested are then sprayed as evenly as possible onto the surface of the powder and very carefully mixed therewith using a spatula and without loss of substance, and all of the mixture is then transferred to a mortar and well triturated with a pestle until the mixture is substantially homogeneous.

A weight aliquot, for example half, of this mixture is then weighed in a Petri dish having a diameter of 10 cm and then evenly distributed therein to form a thin layer. This portion is designated portion A and is stored in an oven for 40 days at a temperature of 60°C in a normal atmosphere. The sample is removed every 3 to 5 days and examined visually for color changes.

The other aliquot of the mixture, designated portion B, is used measuring the initial value of the surface tension (10 g/l of distilled water, 20°C, tensiometer after Lecomte de Nouy), the initial volume of foam following the procedure laid down in German Standard Specification DIN 53,902, Sheet 1 (25°C, 20 g/l, distilled water) and for the color change/storage test (over 40 days) at room temperature in a normal laboratory atmosphere. Visual examination for color changes is effected at the same times as on portion A.

Final tests on surface tension and foam volume are made on samples taken from portion A after 40 days. The final weight of portion A must first be accurately determined in order that the weight aliquot to be used in the surface tension test may be calculated, this being 1.00 g at the commencement of the storage time if, for example, 100 g of 10 g/l solution have been used. The same applies to the preparation of the 20 g/l solution used for the foaming test.

EXPERIMENT 2

50 g of a 50% caustic soda solution are vigorously stirred with 0.5 g of the surfactant to be tested in a glass beaker, the mixture then being transferred to a test tube. This is stored, unclosed, in an oven for 50 days at a temperature of 60°C. The surfactant forms a separate layer at the top of the liquid under these heating conditions. The mixture is examined at regular intervals of from 3 to 5 days for changes of color both in the upper organic phase and in the lower aqueous alkaline phase.

EXPERIMENT 3

10 g of sodium hydroxide tablets are place in a test tube at room temperature, and 20 g of surfactant are poured onto said tablets. The mixture is allowed to stand at room temperature for 12 days in a normal laboratory atmosphere, It is examined at regular intervals, for example every other day, for changes in color both in the upper organic phase and at the liquid/sodium hydroxide interface.

No changes in the color of the samples used in all three experiments could be observed in the products made according to Examples 1, 2, 3, 5 to 13, 15, 17 and 18, not even after the products had been allowed to stand for several weeks.

The products made according to Example 4, 14 and 16 commenced yellowing after 2 to 3 days, this discoloration increasing as the storage time increased.

We claim:

1. A process for the manufacture of surfactants, in which a polyalkoxylated alcohol of formula I $$R^1-(OC_2H_4)_n-(OC_3H_6)_m-O-H \quad (I)$$
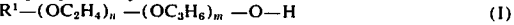

is reacted with a vinyl ether of formula II or III $$CH_2+CH-O-R^2 \quad (II)$$

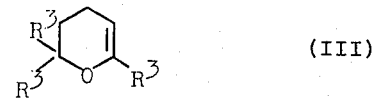

in the presence of an alkaline-reacting agent selected from the group consisting of sodium hydroxide, potassium hydroxide, calcium hydroxide, magnesium hydroxide, sodium carbonate, potassium carbonate, sodium methoxide, sodium ethoxide, potassium t-butoxide, trimethylamine, triethylamine, tri-n-butylamine, tri-isopropylamine, triethanolamine and tri-isobutanolamine, wherein $R^1$ denotes a straight-chain or branched-chain, saturated or unsaturated alkyl radical of from 7 to 22 carvon atoms or a mononuclear or dinuclear alkylaryl radical having from 8 to 12 carbon atoms in the alkyl chain, $R^2$ denotes a straight-chain or branched-chain alkyl radical of from 1 to 10 carbon atoms or an optionally $C_{1-4}$ alkyl-substitued cyclohexyl radical, $R^3$ denotes hydrogen or a $C_{1-4}$ alkyl radical, $n$ is an integer of from 1 to 30 and $m$ is an integer of from 5 to 50, provided that the ratio of $m$ to $n$ is at least 1:1, said process being carried out at a temperature of from 0° to 100°C.

2. A process as set forth in claim 1, wherein $R^1$ denotes a saturated alkyl radical of from 9 to 16 carbon atoms or an octylphenyl, nonylphenyl or dinonylphenyl radical, and the ratio of $m$ to $n$ is from 1.1:1 to 5:1.

3. A process as set forth in claim 1 wherein said process is carried out at a temperature of from 40° to 70°C.

* * * * *